(12) United States Patent
Rapp et al.

(10) Patent No.: US 10,895,092 B2
(45) Date of Patent: Jan. 19, 2021

(54) TIRE ANCHORING SYSTEM

(71) Applicant: Richard Rapp, Morristown, NJ (US)

(72) Inventors: Richard Rapp, Morristown, NJ (US); Keith Sterner, Easton, PA (US)

(73) Assignee: Richard Rapp, Morristown, NJ (US)

( * ) Notice: Subject to any disclaimer, the term of this patent is extended or adjusted under 35 U.S.C. 154(b) by 0 days.

(21) Appl. No.: 16/784,700

(22) Filed: Feb. 7, 2020

(65) Prior Publication Data

US 2020/0332550 A1 Oct. 22, 2020

Related U.S. Application Data

(60) Provisional application No. 62/834,763, filed on Apr. 16, 2019.

(51) Int. Cl.
*E04H 15/06* (2006.01)
*B60J 11/00* (2006.01)
*E04H 6/02* (2006.01)

(52) U.S. Cl.
CPC .............. *E04H 15/06* (2013.01); *B60J 11/00* (2013.01); *E04H 6/025* (2013.01)

(58) Field of Classification Search
CPC .... E04H 15/06; E04H 6/04; B60T 3/00; B60J 11/04; B60J 11/10; B60P 7/0823; B60P 7/083; B60P 7/0846; Y10S 135/906; Y10T 24/31; Y10T 24/2175; E04B 1/34347; E04B 1/34352; G09F 2007/1834; G09F 2007/1886; G09F 2007/1865
USPC .............. 135/88.06, 906; 248/231.41, 229.2, 248/316.4, 228.3, 229.19, 539, 540, 499; 188/32, 36; 211/20–24

See application file for complete search history.

(56) References Cited

U.S. PATENT DOCUMENTS

| 584,017 | A | * | 6/1897 | Sewell | ................... B60R 25/09 70/226 |
| 1,018,798 | A | * | 2/1912 | Whipple et al. | ........ E04H 15/06 135/88.14 |

(Continued)

FOREIGN PATENT DOCUMENTS

| CA | 2550426 A1 | * | 7/2005 | ............ E04H 15/40 |
| CN | 2307073 Y | | 2/1999 | |

(Continued)

OTHER PUBLICATIONS

Lanmodo, "How Lanmodo Auto Car Tent Be Anti-Theft" <https://www.lanmodo.com/video/how-lanmodo-auto-car-tent-be-anti-theft.html>, retrieved Apr. 5, 2017.

*Primary Examiner* — Robert Canfield
(74) *Attorney, Agent, or Firm* — Volpe Koenig

(57) ABSTRACT

A tire anchoring system is disclosed. The system includes at least one anchoring assembly including a first bracket and a second bracket. The first bracket has a first bar and a second bar extending parallel to each other, and a first intermediate bar connecting the first bar and the second bar to define a first pocket dimensioned to engage at least a portion of a first tire. The second bracket has a third bar and a fourth bar extending parallel to each other, and a second intermediate bar connecting the third bar and fourth second bar to define a second pocket dimensioned to engage at least a portion of a second tire. A tensioning linkage connects the first bracket and the second bracket.

18 Claims, 8 Drawing Sheets

(56) References Cited

U.S. PATENT DOCUMENTS

| | | | | |
|---|---|---|---|---|
| 1,401,971 | A * | 1/1922 | Faison | B60R 25/09 70/15 |
| 1,443,009 | A * | 1/1923 | Davis | B60R 25/09 70/226 |
| 1,488,893 | A * | 4/1924 | Plouffe | B60R 25/09 70/226 |
| 1,504,220 | A * | 8/1924 | Degen | B60R 25/09 70/227 |
| 2,798,501 | A | 7/1957 | Oliver | |
| 2,908,522 | A * | 10/1959 | Glave | E05C 17/36 292/288 |
| 2,983,472 | A * | 5/1961 | Bowling | E04H 13/003 248/27.8 |
| 2,989,967 | A * | 6/1961 | Lee | E04H 15/06 135/88.13 |
| 3,245,239 | A * | 4/1966 | Zaidener | B60R 25/0221 70/202 |
| 3,664,164 | A * | 5/1972 | Zaidener | B60R 25/0221 70/202 |
| 3,940,099 | A * | 2/1976 | McCleskey | E04H 15/62 248/511 |
| 4,605,030 | A * | 8/1986 | Johnson | E04H 6/04 135/117 |
| 4,655,236 | A * | 4/1987 | Dorame | E04H 6/025 135/88.06 |
| 4,886,083 | A * | 12/1989 | Gamache | E04H 6/005 135/88.06 |
| 4,944,321 | A * | 7/1990 | Moyet-Ortiz | B60J 11/00 135/148 |
| 5,158,103 | A * | 10/1992 | Leu | E04H 12/2238 135/114 |
| 5,186,585 | A * | 2/1993 | Sousa | A61G 3/0808 188/2 F |
| 5,241,977 | A * | 9/1993 | Flores | B60J 11/00 135/119 |
| 5,271,636 | A * | 12/1993 | Mohrman | A61G 5/10 280/304.1 |
| 5,295,500 | A * | 3/1994 | Leu | E04H 12/2238 135/114 |
| 5,476,127 | A | 12/1995 | Fournier | |
| 5,575,300 | A * | 11/1996 | James | B60J 11/00 135/88.01 |
| 5,724,839 | A * | 3/1998 | Thering | B60R 25/09 70/18 |
| 5,740,826 | A | 4/1998 | Nevin et al. | |
| 5,746,237 | A | 5/1998 | Arnic | |
| 5,857,477 | A * | 1/1999 | James | B60J 11/00 135/88.01 |
| 5,927,108 | A * | 7/1999 | Pierce | B60R 25/093 188/32 |
| 6,981,509 | B2 * | 1/2006 | Sharapov | B60J 11/02 114/361 |
| 6,997,022 | B1 * | 2/2006 | DeMange | B60R 25/093 70/19 |
| 7,604,016 | B2 | 10/2009 | Songest | |
| 7,946,306 | B2 * | 5/2011 | Ampoyo | B60J 11/00 135/88.06 |
| 8,267,106 | B2 | 9/2012 | Jordache et al. | |
| 8,601,841 | B1 * | 12/2013 | Jacobs | B60R 25/09 70/237 |
| 9,010,348 | B1 | 4/2015 | Kite | |
| 9,796,322 | B1 * | 10/2017 | Miller | B60P 7/083 |
| 2002/0100498 | A1 | 8/2002 | Schlier | |
| 2004/0123892 | A1 * | 7/2004 | Kim | E04H 6/025 135/88.08 |
| 2005/0252258 | A1 * | 11/2005 | Peacock | B60R 25/093 70/226 |
| 2008/0053505 | A1 * | 3/2008 | Ampoyo | E04H 6/025 135/88.06 |
| 2009/0119892 | A1 * | 5/2009 | Breeden | B60P 7/083 24/68 CD |
| 2009/0183809 | A1 | 7/2009 | Wiegel | |
| 2010/0126546 | A1 | 5/2010 | Chen | |
| 2011/0168219 | A1 * | 7/2011 | Griffith | A45B 23/00 135/88.06 |
| 2012/0031321 | A1 | 2/2012 | Ying | |
| 2015/0143729 | A1 * | 5/2015 | Pyc | G09F 15/0012 40/607.1 |
| 2016/0035257 | A1 * | 2/2016 | Likas | G09F 21/04 40/591 |
| 2016/0090029 | A1 * | 3/2016 | Levytsky | B60Q 7/005 340/473 |
| 2020/0047598 | A1 * | 2/2020 | Garcia | B60J 11/04 |

FOREIGN PATENT DOCUMENTS

| | | | | |
|---|---|---|---|---|
| CN | 201086627 Y | | 7/2008 | |
| CN | 201329790 Y | | 10/2009 | |
| DE | 202012103625 U1 | * | 10/2012 | B60J 11/04 |
| EP | 80893 A1 | * | 6/1983 | |
| FR | 2692539 A1 | * | 12/1993 | B60P 3/077 |
| GB | 2106058 A | * | 4/1983 | E05C 19/186 |

* cited by examiner

TIRE ANCHORING SYSTEM

CROSS REFERENCE TO RELATED APPLICATION

This application claims the benefit of U.S. Provisional Application No. 62/834,763, filed Apr. 16, 2019, which is incorporated by reference as if fully set forth.

FIELD OF INVENTION

This invention is generally related to a tire anchoring system.

BACKGROUND

Tire anchoring systems can be used for a variety of purposes, such as supporting a vehicle canopy, awning, banner, or other attachments. Existing tire anchoring systems typically require users to maneuver a vehicle onto support plates of the tire anchoring system, or require users to wrap and intertwine chains and/or cables through the vehicle's tires or hubcaps.

Existing tire anchoring systems are disclosed in U.S. Pat. No. 4,944,321 and CN Pub. 201086627.

It would be desirable to provide a tire anchoring system that is (i) easy to deploy, (ii) includes adjustability features to accommodate tires of different sizes, and (iii) provides a reliable and secure connection to a vehicle's tires.

SUMMARY

Briefly stated, an improved tire anchoring system is disclosed. The system includes at least one anchoring assembly having a first bracket and a second bracket. The first bracket includes a first bar and a second bar extending parallel to each other, and a first intermediate bar connecting the first bar and the second bar to define a first pocket dimensioned to engage at least a portion of a first tire. The second bracket includes a third bar and a fourth bar extending parallel to each other, and a second intermediate bar connecting the third bar and fourth second bar to define a second pocket dimensioned to engage at least a portion of a second tire. A tensioning linkage connects the first bracket and the second bracket.

The tire anchoring system disclosed herein is relatively easy to deploy and provides improved rigidity compared to known tire anchoring systems. Additionally, the tire anchoring system does not require driving the vehicle onto plates or pads for deployment, or wrapping a linkage through the tires.

Preferably, the at least one anchoring assembly includes a first anchoring assembly and a second anchoring assembly, and each assembly includes respective pairs of the first bracket and the second bracket. The first pocket of the first bracket of the first anchoring assembly is dimensioned to engage a front right tire, the second pocket of the second bracket of the first anchoring assembly is dimensioned to engage a rear right tire, a first pocket of the first bracket of the second anchoring assembly is dimensioned to engage a front left tire, and a second pocket of the second bracket of the second anchoring assembly is dimensioned to engage a rear left tire.

In one embodiment, the tensioning linkage includes a cable, strap, or chain. The tensioning linkage can include a locking assembly. The tensioning linkage preferably connects directly to the first bar of the first bracket and the first bar of the second bracket.

The tire anchoring system can include an upright post assembly connected to at least one of the first bracket or the second bracket. The upright post assembly is preferably configured to support at least one pole. The at least one pole can include a plurality of curved poles that are configured to support a canopy, awning, flag, banner, or other attachments. The at least one pole can include other poles that are each configured to extend straight above a vehicle.

The first intermediate bar and the second intermediate bar are each adjustable to fit tires of different widths. At least one of the first intermediate bar or the second intermediate bar includes a length adjuster assembly. Additional length adjusters can be incorporated into the tire anchoring system. In one embodiment, the length adjuster assembly includes a biased snap button and a plurality of openings dimensioned to receive the biased snap button. This arrangement provides a telescoping arrangement between two bars to slide the bars relative to each other and provide a bar assembly of varying lengths.

The first bracket and the second bracket are each respectively configured to engage the first tire and the second tire at a location of the first tire and the second tire spaced directly above a ground support surface.

In another embodiment, a method of securing a tire anchoring system to a vehicle is provided. The method includes providing the anchoring assembly, and engaging the first bracket directly against the first tire of a vehicle and engaging the second bracket directly against the second tire of the vehicle. The method includes connecting the first bracket with the second bracket via a tensioning linkage such that first bracket engages the first tire at a location above a ground support surface, and the second bracket engages the second tire at a location above the ground support surface.

Preferred arrangements with one or more features of the invention are described below and in the claims.

BRIEF DESCRIPTION OF THE DRAWINGS

The foregoing summary as well as the following detailed description will be best understood when read in conjunction with the appended drawing. In the drawing.

DETAILED DESCRIPTION OF THE PREFERRED EMBODIMENTS

Figure 1A:
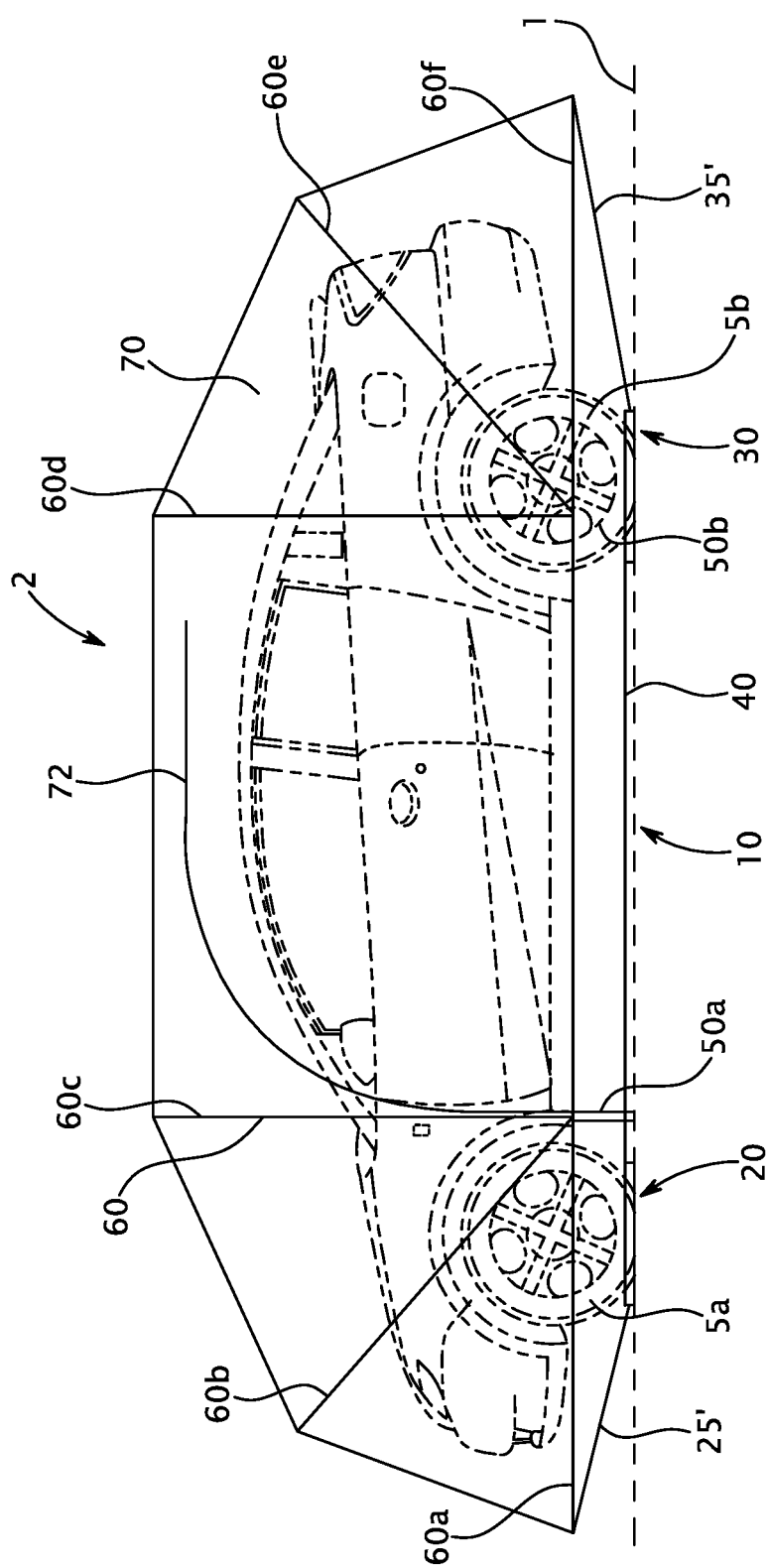
FIG. 1A is a side view of a tire anchoring system attached to a vehicle according to an embodiment.

Certain terminology is used in the following description for convenience only and is not limiting. The words "inner,"

"outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 1B:
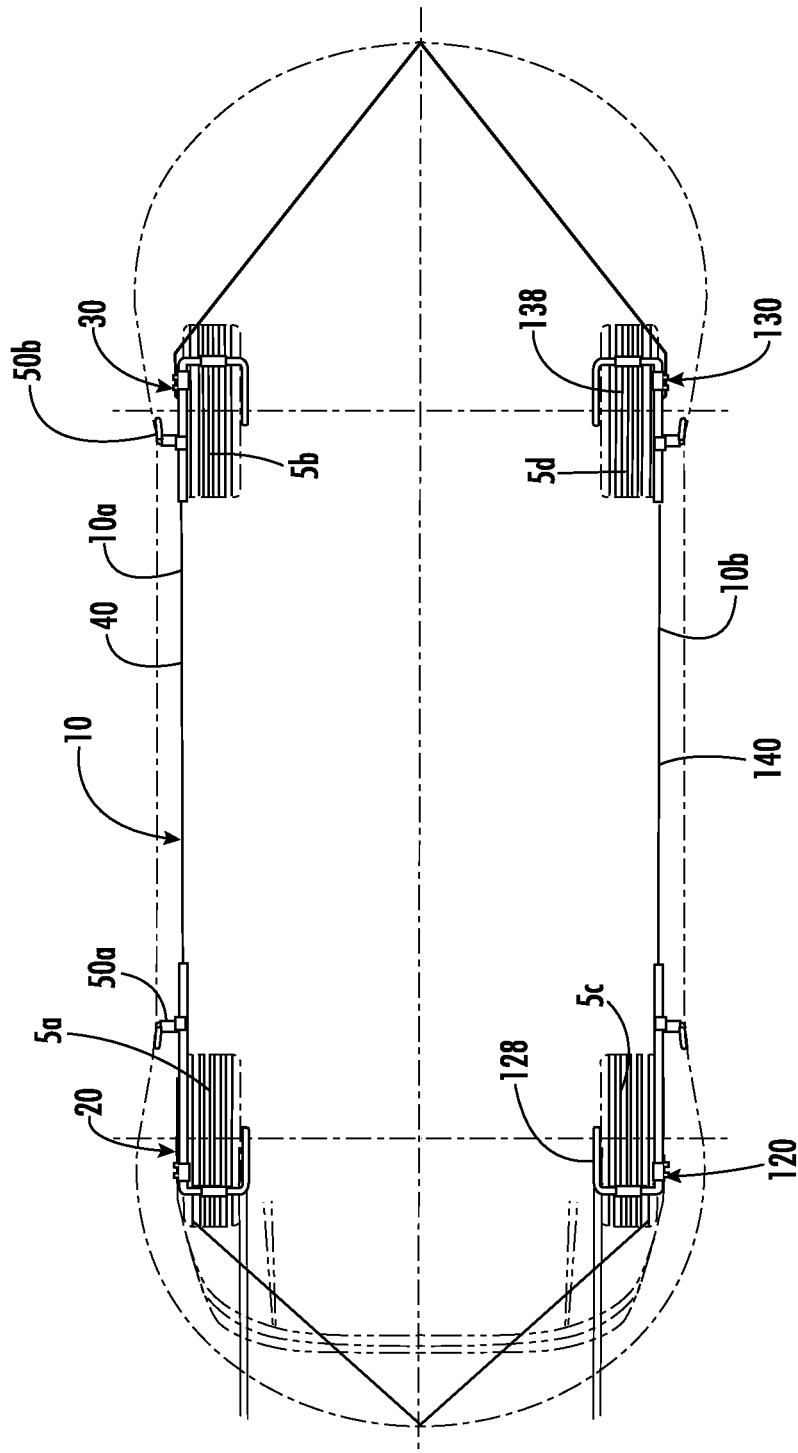
FIG. 1B is a bottom view of the tire anchoring system of FIG. 1A.
Figure 1C:
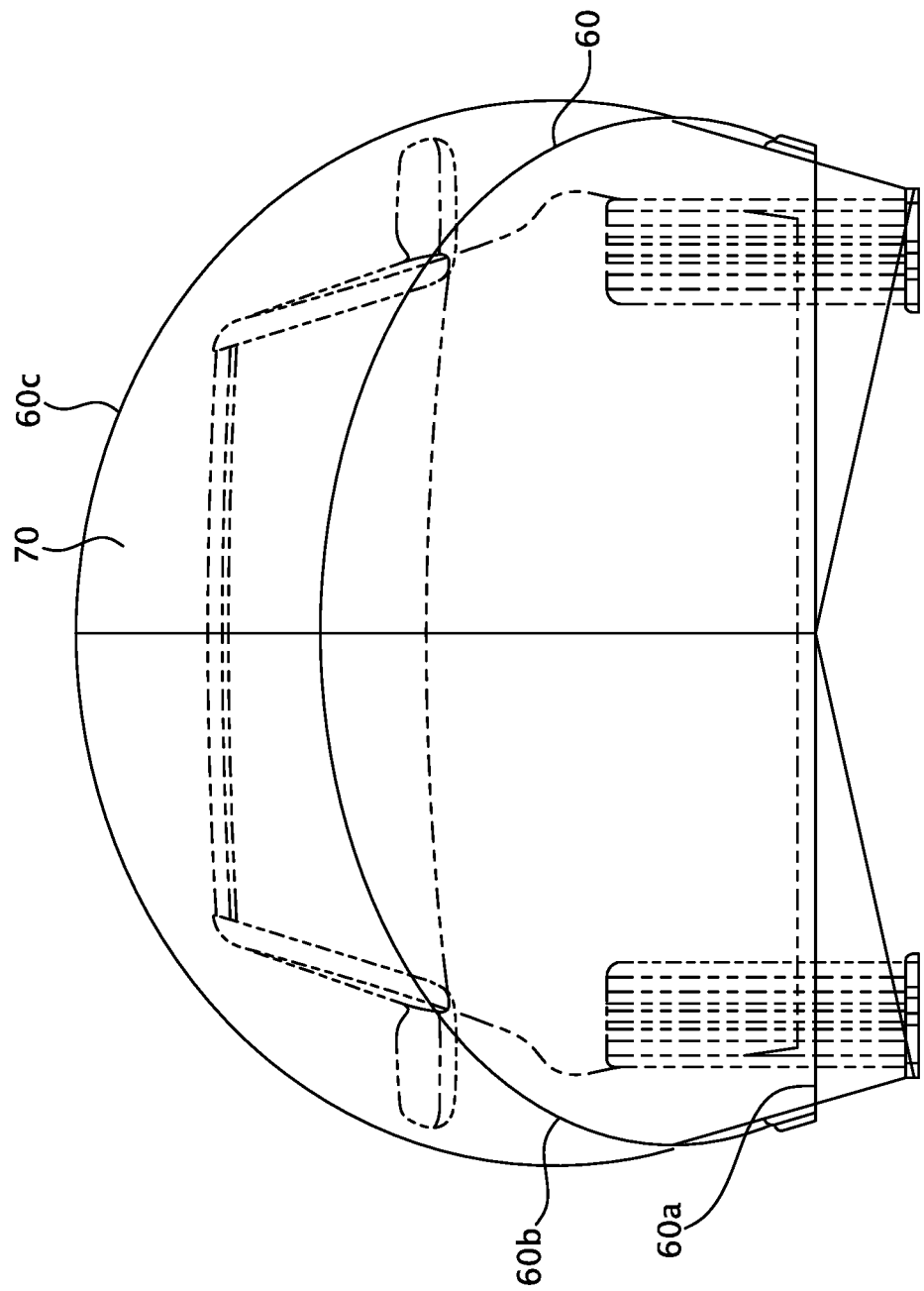
FIG. 1C is a front view of the tire anchoring system of FIGS. 1A and 1B.

As shown in FIGS. 1A-1C, a tire anchoring system 2 is illustrated. The tire anchoring system 2 includes at least one anchoring assembly 10. The term tire anchoring system 2 is used generally herein to include the anchoring assembly 10 as well as any attachments.

The anchoring assembly 10 generally includes a first bracket 20 and a second bracket 30. As shown in more detail in FIGS. 2A and 2B, the first bracket 20 includes a first bar 22 and a second bar 24 extending parallel to each other, and a first intermediate bar 26 connecting the first bar 22 and the second bar 24 to define a first pocket 28 dimensioned to engage at least a portion of a first tire 5a. The second bracket 30 has a third bar 32 and a fourth bar 34 extending parallel to each other with a second intermediate bar 36 connecting the third bar and fourth second bar to define a second pocket 38 dimensioned to engage at least a portion of a second tire 5b. The first bracket 20 and the second bracket 30 each generally have a J-shaped profile.

As used herein, the term bar generally refers to any type of pole, rod, post, or support. One of ordinary skill in the art would understand that the bars disclosed herein can be composed of a plurality of bars. Intermediate connections can be provided between any one or more of the bars.

A tensioning linkage 40 is connected to the first bracket 20 and the second bracket 30. The tensioning linkage 40 provides a tensioning force between the first bracket 20 and the second bracket 30 such that the first bracket 20 maintains engagement with the first tire 5a and the second bracket 30 maintains engagement with the second tire 5b. In one embodiment, the tensioning linkage 40 can include a ratcheting assembly to tighten the tensioning linkage 40 to more securely engage the brackets 20, 30 against the tires 5a, 5b.

The tensioning linkage 40 can include any type of cable, wire, chain, strap, or other type of linkage. The tensioning linkage 40 can be elastic or rigid. In one embodiment, the tensioning linkage 40 includes a locking assembly 42. The locking assembly 42 can include any type of locking components, which can require a key, access code, or combination to be unlocked.

The tensioning linkage 40 preferably connects directly to the first bar 22 of the first bracket 20 and the first bar 32 of the second bracket 30. One of ordinary skill in the art would understand that the tensioning linkage 40 can connect to other components of the first bracket 20 and the second bracket 30.

The first bracket 20 and the second bracket 30 are each respectively configured to engage the first tire 5a and the second tire 5b at a location of the first tire 5a and the second tire 5b directly above a ground support surface 1. The first bracket 20 and the second bracket 30 engage against surfaces of the tires 5a, 5b. Engagement surfaces of the brackets 20, 30 with the tires 5a, 5b can be treated or coated with friction increasing materials to provide a more reliable engagement surface with the tires 5a, 5b. The first bracket 20 and the second bracket 30 provide a configuration that does not require wrapping or threading the tensioning linkage 40 around the tires 5a, 5b. Accordingly, deployment of the anchoring assembly 10 is simplified.

The anchoring assembly 10 preferably includes a first anchoring assembly 10a (for the front and rear right tires) and a second anchoring assembly 10b (for the front and rear left tires). Each anchoring assembly 10 includes respective pairs of the first bracket 20 and the second bracket 30.

The first pocket 28 of the first bracket 20 of the first anchoring assembly 10a is dimensioned to engage a front right tire 5a, the second pocket 38 of the second bracket 30 of the first anchoring assembly 10a is dimensioned to engage a rear right tire 5b, a first pocket 128 of the first bracket 120 of the second anchoring assembly 10b is dimensioned to engage a front left tire 5c, and a second pocket 138 of the second bracket 130 of the second anchoring assembly 10b is dimensioned to engage a rear left tire 5d. In this way, each of the four tires 5a-5d of a vehicle are engaged by the tire anchoring system 2.

Figure 3A:
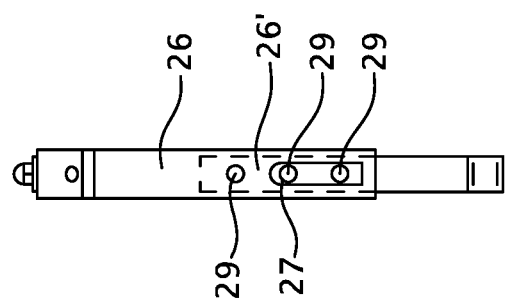
FIG. 3A is a magnified view of a length adjustment assembly for the brackets of FIGS. 2A and 2B.

The first intermediate bar 26 and the second intermediate bar 36 are preferably each adjustable to fit tires of different sizes. A length adjuster assembly 26', 36' can be provided to adjust the first intermediate bar 26 and the second intermediate bar 36. As shown in FIG. 3A, the length adjuster assembly 26' can include a biased snap button 27 and a plurality of openings 29 dimensioned to receive the biased snap button 27. Other adjustability features can be provided to alter a length of the bars, as described herein.

The tire anchoring system 2 can also include an upright post assembly 50a, 50b connected to the first bracket 20 or the second bracket 30. The upright post assembly 50a, 50b is preferably configured to support at least one pole 60. The upright post assembly 50a is shown in more detail in FIG. 3B.

As used herein, the term upright post assembly is generally used to refer to any connection arrangement for attaching a secondary component to the anchoring assembly. One of ordinary skill in the art would understand based on the present disclosure that any type of secondary assembly can be connected to the anchoring assembly via the upright post assemblies, such as canopies, support structures, or other coverings.

Figure 3B:
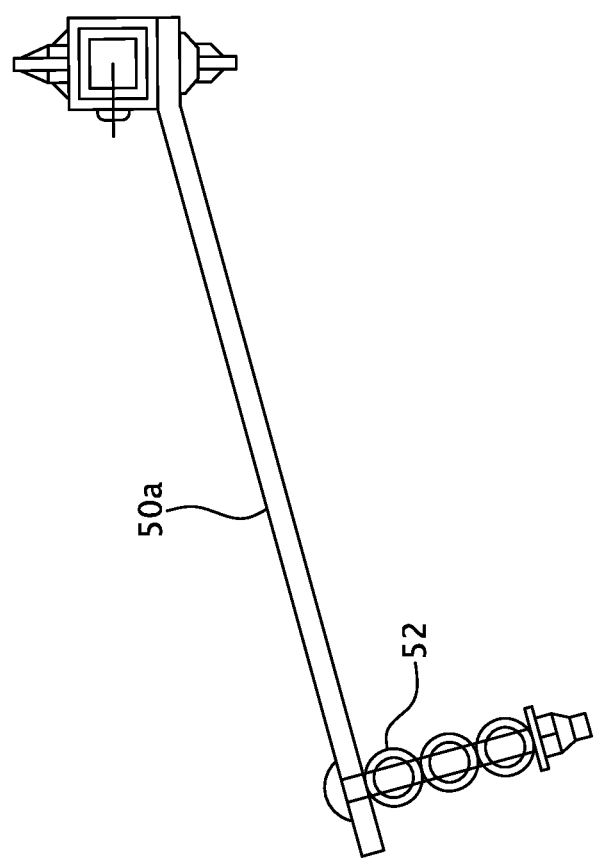
FIG. 3B is a magnified view of an upright post assembly for the brackets of FIGS. 2A and 2B.

The upright post assembly 50a, 50b can include a first upright post assembly 50a connected to the first bracket 20 and a second upright post assembly 50b connected to the second bracket 30. As shown in FIG. 3B, the upright post assembly 50a can include a plurality of attachment regions 52 for connecting poles 60.

In one embodiment, the at least one pole 60 includes a plurality of curved poles 60a-60f that are configured to support a canopy 70. The canopy 70 is configured to completely surround a vehicle. In one embodiment, the canopy 70 can include an access door 72, through which a user can access the doors of the vehicle without having to remove the tire anchoring system 2. The canopy 70 can be formed from polyester, canvas, or nylon. The poles 60a-60f can be formed from a flexible material.

Figure 4:
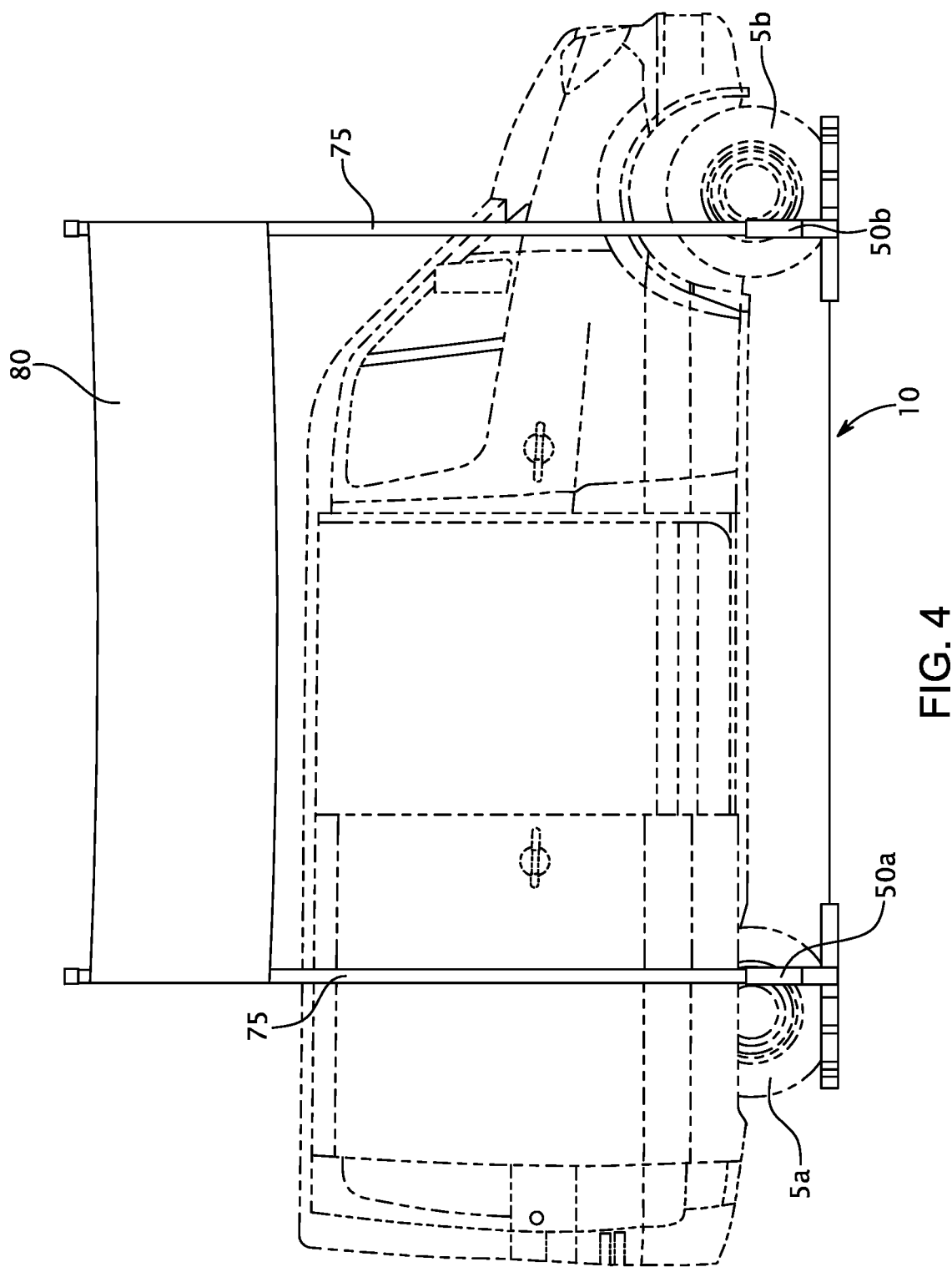
FIG. 4 is a side view of the tire anchoring system supporting a banner.

As shown in FIG. 4, in one embodiment, the anchoring assembly 10 includes the upright post assemblies 50a, 50b to support a banner 80. Posts 75 can extend from the upright post assemblies 50a, 50b to support the banner 80. In the embodiment of FIG. 4, only a single one of the anchoring assemblies 10 is required, such that only two tires 5a, 5b are engaged by the anchoring assembly 10.

Figure 2A:
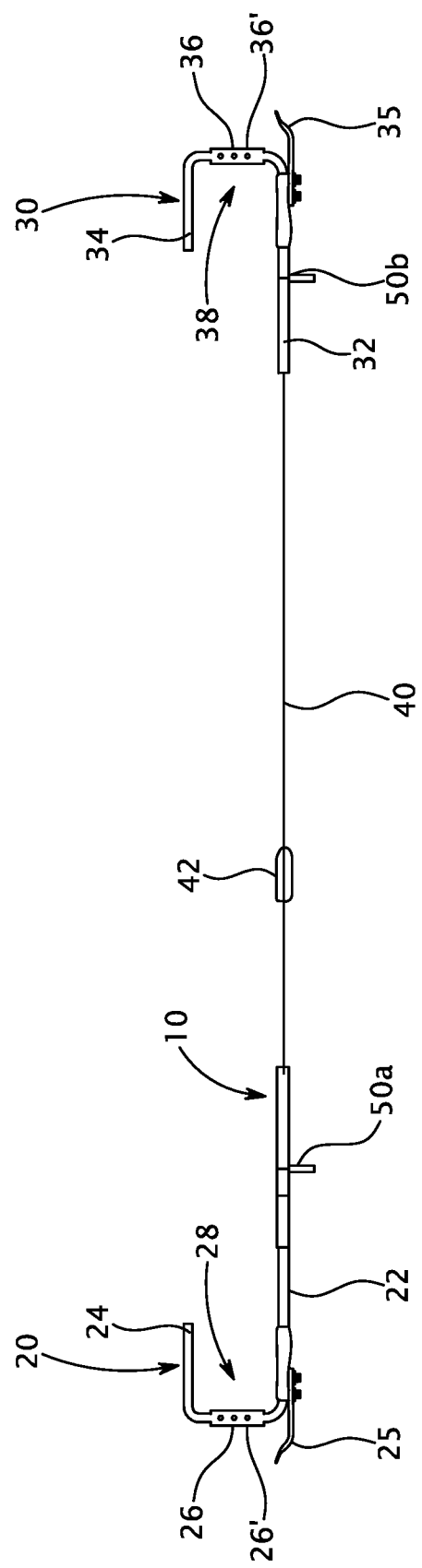
FIG. 2A is a top view of the brackets and tensioning linkage of the tire anchoring system of FIGS. 1A-1C in an uninstalled state.
Figure 2B:
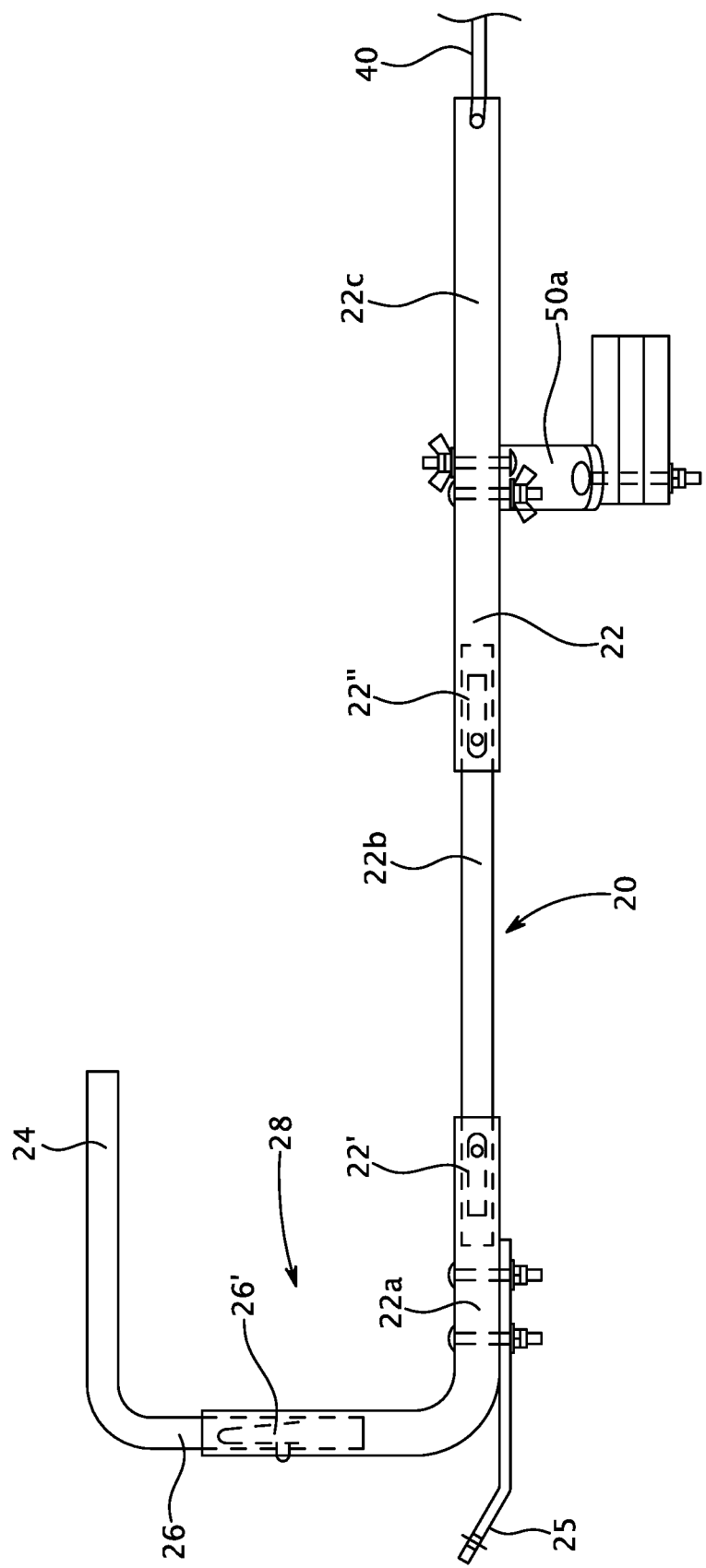
FIG. 2B is a magnified view of one of the brackets from FIG. 2A.

As shown in FIGS. 2A and 2B, a secondary post 25, 35 can be provided that extends from the first bracket 20 and second bracket 30. respectively. The secondary post 25, 35 can provide an anchoring point for a tether 25', 35' that is secured to a portion of the canopy 70. One of ordinary skill in the art would understand that the secondary posts 25, 35 are optional.

Each of the bars disclosed herein can include adjustability features, which allow the length of the bars to be altered. For example, in FIG. 2B, length adjusters 22', 22" are provided for the first bar 22. As shown in FIG. 2B, the pocket 28 is formed by two L-shaped bars connected to each other at the length adjuster assembly 26'. As shown in FIG. 2B, the first bar 22 can include a plurality of bars 22a, 22b, 22c connected to each other via the length adjusters 22', 22". Length adjuster 22" forms a connection between bar 22b and the bar 22c attached to an upright post assembly 50a. The bars 22a, 22b, 22c can be connected to each other via a telescoping arrangement in which the bars 22a, 22b, 22c slide within each other. One of ordinary skill in the art would understand that the length adjusters 22', 22" can also be used to remove individual bars from the assembly. In one embodiment, the upright post assembly 50a can be removed and the tensioning linkage 40 connects directly to bar 22b. Each of the length adjusters 22a', 22" can include similar features as length adjuster assembly 26', such as a snap button/opening configuration.

Each of the bars disclosed herein can be formed from metal, such as steel or aluminum tubing, and each bar can include the telescoping features described herein. One of ordinary skill in the art would understand that the bars can be formed from any material suitable to withstand forces from the tensioning linkage 40.

A method of securing a tire anchoring system 2 to a vehicle is also provided. The method includes providing an anchoring assembly 10 including the features described herein. The method includes engaging the first bracket 20 directly against at least a portion of a first tire 5a of a vehicle and engaging the second bracket 30 directly against at least a portion of a second tire 5b of the vehicle. The method includes connecting the first bracket 20 with the second bracket 30 via the tensioning linkage 40 such that first bracket 20 engages the first tire 5a at a location above a ground support surface 1, and the second bracket 30 engages the second tire 5b at a location above the ground support surface 1.

One of ordinary skill in the art would understand based on the present disclosure that the embodiments disclosed herein can be used in conjunction with any vehicle including tires. The term vehicle is used generally herein to include any automobile, car, bus, van, motorcycle, scooter, etc.

Having thus described various embodiments of the present invention in detail, it is to be appreciated and will be apparent to those skilled in the art that many changes, only a few of which are exemplified in the detailed description above, could be made without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A tire anchoring system comprising:
   at least one anchoring assembly including:
      a first bracket having a first bar and a second bar extending parallel to each other, and a first intermediate bar connecting the first bar and the second bar to define a first pocket dimensioned to engage at least a portion of a first tire;
      a second bracket having a third bar and a fourth bar extending parallel to each other, and a second intermediate bar connecting the third bar and fourth second bar to define a second pocket dimensioned to engage at least a portion of a second tire; and
      a tensioning linkage connecting the first bracket and the second bracket; and
      at least one upright post assembly connected to at least one of the first bracket or the second bracket, and the at least one upright post assembly is configured to support at least one pole.

2. The tire anchoring system of claim 1, wherein the at least one anchoring assembly includes a first anchoring assembly and a second anchoring assembly, each anchoring assembly including respective pairs of the first bracket and the second bracket.

3. The tire anchoring system of claim 2, wherein the first pocket of the first bracket of the first anchoring assembly is dimensioned to engage a front right tire, the second pocket of the second bracket of the first anchoring assembly is dimensioned to engage a rear right tire, a first pocket of the first bracket of the second anchoring assembly is dimensioned to engage a front left tire, and a second pocket of the second bracket of the second anchoring assembly is dimensioned to engage a rear left tire.

4. The tire anchoring system of claim 1, wherein the tensioning linkage includes a cable, a strap, or a chain.

5. The tire anchoring system of claim 1, wherein the tensioning linkage includes a locking assembly.

6. The tire anchoring system of claim 1, wherein the at least one upright post assembly includes a first upright post assembly connected to the first bracket and a second upright post assembly connected to the second bracket.

7. The tire anchoring system of claim 1, wherein the at least one pole includes a plurality of curved poles that are each configured to support a canopy.

8. The tire anchoring system of claim 1, wherein the at least one pole is configured to extend straight above a vehicle.

9. The tire anchoring system of claim 1, wherein the tensioning linkage connects directly to the first bar of the first bracket and the first bar of the second bracket.

10. The tire anchoring system of claim 1, wherein the first intermediate bar and the second intermediate bar are each adjustable to fit tires of different sizes.

11. The tire anchoring system of claim 1, wherein at least one of the first intermediate bar or the second intermediate bar includes at least one length adjuster assembly.

12. The tire anchoring system of claim 11, wherein the at least one length adjuster assembly includes a plurality of length adjuster assemblies, and each of the first bracket and the second bracket includes at least one length adjuster assembly of the plurality of length adjuster assemblies.

13. The tire anchoring system of claim 11, wherein the at least one length adjuster assembly includes a biased snap button and a plurality of openings dimensioned to receive the biased snap button.

14. A method of securing a tire anchoring system to a vehicle, the method comprising:
   providing a tire anchoring system including:
      a first bracket having a first bar and a second bar extending parallel to each other, and a first intermediate bar connecting the first bar and the second bar to define a first pocket dimensioned to engage at least a portion of a first tire;
      a second bracket having a third bar and a fourth bar extending parallel to each other, and a second intermediate bar connecting the third bar and fourth second bar to define a second pocket dimensioned to engage at least a portion of a second tire;
a tensioning linkage connecting the first bracket and the second bracket; and
at least one upright post assembly connected to at least one of the first bracket or the second bracket, and the at least one upright post assembly is configured to support at least one pole;
engaging the first bracket directly against the first tire of a vehicle and engaging the second bracket directly against the second tire of the vehicle; and
connecting the first bracket with the second bracket via the tensioning linkage such that first bracket engages the first tire, and the second bracket engages the second tire.

15. The method of claim 14, wherein the tensioning linkage includes a locking assembly.

16. The method of claim 14, wherein the first intermediate bar and the second intermediate bar are each adjustable to fit tires of different sizes.

17. The method of claim 14, wherein at least one of the first intermediate bar or the second intermediate bar includes at least one length adjuster assembly.

18. The method of claim 17, wherein the at least one length adjuster assembly includes a biased snap button and a plurality of openings dimensioned to receive the biased snap button.

* * * * *